June 6, 1967    R. C. BECK ET AL    3,323,355

VIBRATION TABLE

Filed Aug. 26, 1964

Russell C. Beck
Stanley Farrow,
INVENTORS.

United States Patent Office 3,323,355
Patented June 6, 1967

3,323,355
VIBRATION TABLE
Russell C. Beck, Huntsville, Ala., and Stanley Farrow, deceased, late of Huntsville, Ala., by Frances R. Farrow, administratrix, Huntsville, Ala., assignors to the United States of America as represented by the Secretary of the Army
Filed Aug. 26, 1964, Ser. No. 392,355
11 Claims. (Cl. 73—71.6)

ABSTRACT OF THE DISCLOSURE

A vibration apparatus having a platform mounted for vertical movement and vibrated by the interaction of an electromagnet mounted on the platform and by alternately opposite poles of permanent magnets that are sequentially brought into the electrical field of the electromagnet to cause the platform to move up and down.

The invention described herein may be manufactured and used by or for the Government for governmental purposes without the payment of any royalty thereon.

This invention relates to a vibration table which is used to subject missile systems and subsystems to conditions of extreme vibration at various frequencies and amplitudes. With the advances being made in modern missiles it has become more and more important to determine with accuracy, the durability as well as the dependability of the various components, subsystems and systems which are to be used in these missiles. Vibration tables of many types are now in use. Existing vibrators range from mechanical to electronic vibrators which vary a great deal in operation, durability and especially versatility. My invention is particularly adapted to test missile apparatus with vibrations having predetermined frequencies, periods and amplitudes. The present device is thus capable of recreating any vibration encountered by missile systems in flight.

Prior to my invention mechanical vibrators have been somewhat limited as to the speeds at which they are capable of operating. Electrical or electronic vibration equipment is generally speaking quite expensive.

Accordingly it is an object of my invention to provide a vibration table capable of producing vibrations at variable frequency and amplitude.

Another object of my invention is to provide a vibration table which is simple to manufacture as well as to operate.

A further objector of this invention is to provide a reliable and relatively inexpensive vibration table.

Still another object of my invention is to provide a vibrator which is capable of operating at extreme frequencies for long periods of time.

Figure 2:
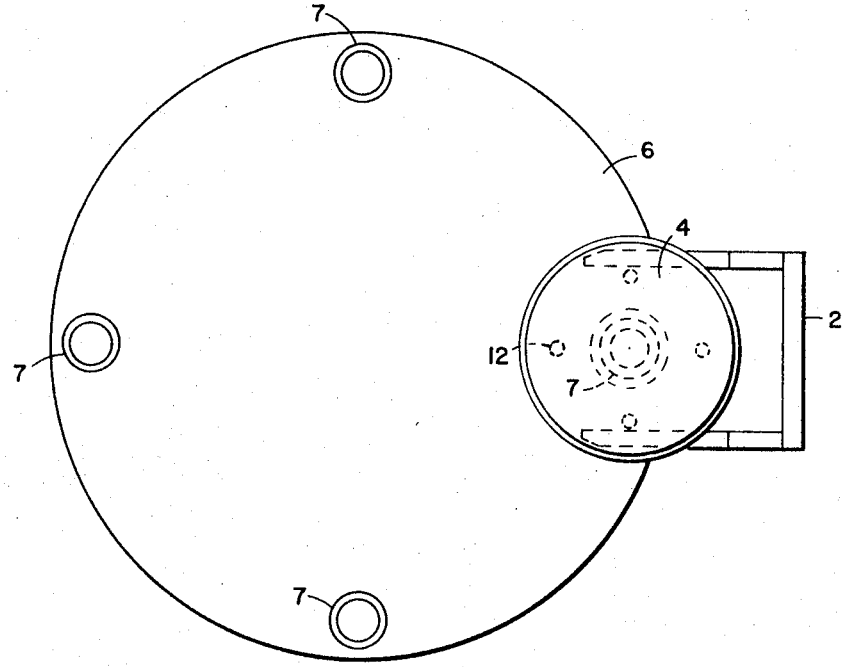
Figure 1:
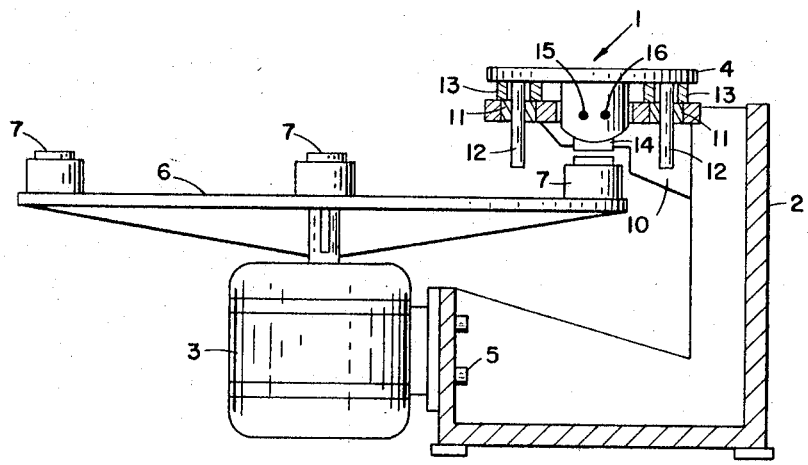

This invention together with other objects and advantages will best be understood by reference to the following description and accompanying drawings in which:

FIGURE 1 is an elevational view of the device showing a general arrangement of its components, some of which are shown in section for purposes of clarity; and FIGURE 2 is a plan view of the device illustrated in FIGURE 1.

Referring now to FIGURE 1, a vibration table 1 is made up of three major components, these being a frame 2, a variable speed electric motor 3 and a vibration platform 4. Electric motor 3 is adjustably mounted to the frame by mounting bolts 5. Attached to the drive shaft of the electric motor is a rotatable mounting plate 6 which serves as a platform for mounting actuator magnets 7. A platform bracket 10 extends from main frame 2 to support vibration platform 4. A plurality of guide bearings 11 are mounted atop the platform bracket and serve as vertical guides for pins 12 which are rigidly attached to the underside of vibration platform 4. Also attached to the vibration table is a plurality of bumper elements 13 which may be of any desirable material, however a resilient material or spring coils may in some instances be more desirable. An electromagnet 14 is attached to the central portion of the underside of the vibration platform and serves as a reaction member which cooperates with the actuating magnets mounted on rotatable plate 6. A voltage source (not shown) is connected to electromagnet 14 at terminals 15 and 16. Thus the amplitude at which platform 4 is vibrated may be varied during operation of the device by varying the current supplied to the electromagnet which in turn increases or decreases its field strength. Although not variable, a permanent magnet may be a satisfactory substitute for electromagnet 14 in some instances.

In operation of the device a missile component or whatever object is to be tested is placed upon vibration platform 4. Variable speed motor 3 is then adjusted on frame 2 to provide a clearance between the platform magnet and the rotating actuator magnets which will result in the desired vibration amplitude. The motor is then started and rotates the actuator magnets immediately beneath platform magnet 14. The polarity of the actuator magnets may be alternated such that a magnet having a positive polarity will follow a magnet having a negative polarity in the rotational cycle. Thus, it will be seen that the platform floor will be raised and lowered to an amplitude which is dependent upon the strength and proximity of the magnets. The field strength of the platform electromagnet may, of course, be altered by varying the current supplied thereto. The vibration frequency of the platform is dependent upon the speed of rotation of the actuator magnets. The period of the vibration curve is dependent upon the surface area of the magnets and may be altered by simply varying the rotational length of the magnets. That is, a magnet may be lengthened along the circumferential line of rotation thus causing table 4 to remain either up or down for longer periods of time.

Thus it will be seen that the present invention provides the simple versatility which is so essential in a vibration platform which must duplicate the vibrations experienced by missiles in flight.

While the foregoing is a description of the preferred embodiment the following claims are intended to include those variations and modifications that are within the spirit and scope of the invention.

We claim:
1. A vibration table comprising a frame, said frame having a platform bracket and a motor mount, a motor attached to said motor mount, said motor having a rotatable shaft, a mounting plate attached to the shaft of said motor, a plurality of magnets attached to said plate at equal distances from the center thereof, said magnets being circumferentially spaced around said plate, each of said magnets having a polarity opposite the polarity of the magnets adjacent thereto, a vibration platform mounted on said platform bracket for vertical movement thereon, means for guiding said platform in a vertical direction, magnet means attached to said platform, said magnet means being located in close proximity to and in vertical alignment with individual of the the magnet means attached to said mounting plate as said plate is rotated by said motor.

2. A device as set forth in claim 1, wherein said motor is vertically adjustable.

3. A device as set forth in claim 2, wherein, said means for guiding the platform in a vertical direction consist of a plurality of bearings mounted within said platform bracket, and a vertical pin extending through each of said bearings, each of said pins being attached to said vibration platform.

4. A device as set forth in claim 3 wherein a plurality of platform bumpers are mounted between said platform and said platform bracket.

5. A device as set forth in claim 4 wherein said platform bumpers are resilient.

6. A vibration table comprising a vibration platform mounted for vertical movement and having an electromagnet attached thereto, means for guiding the platform in a vertical direction, a plurality of actuator magnets arranged beneath said platform magnet, a support for said magnets, said magnets being spaced from each other and symmetrically mounted on said support with at least one pole of each magnet projecting from said support, the polarity of adjacent projecting poles being opposite from each other, and means for mixing the support to sequentially place the poles within the field of said platform magnet whereby said platform will be moved alternately toward and away from said actuator magnets as said magnets pass within the field of the platform magnet.

7. A device as set forth in claim 6 wherein said support is a rotatable mounting plate and said actuator magnets are rigidly attached to said rotatable mounting plate.

8. A device as set forth in claim 7 wherein said support moving means is a variable speed electric motor and said mounting plate is attached to the shaft of said variable speed electric motor.

9. A device as set forth in claim 8 wherein a plurality of resilient platform bumpers are mounted immediately beneath said platform for contact therewith.

10. A device as set forth in claim 9 wherein said guide means comprises a plurality of guide pins attached to said vibration platform, each of said guide pins being mounted within a guide bearing.

11. A device as set forth in claim 10 wherein said variable speed electric motor is adapted to be adjusted so as to vary the distance between said actuator magnets and said platform magnet.

References Cited

UNITED STATES PATENTS

| | | | |
|---|---|---|---|
| 2,587,317 | 2/1952 | Henry | 73—67.4 |
| 2,599,036 | 6/1952 | Efromson et al. | 73—71.6 X |

FOREIGN PATENTS

| | | |
|---|---|---|
| 521,591 | 9/1955 | Belgium. |

JAMES J. GILL, *Primary Examiner.*